(12) United States Patent
Chiu et al.

(10) Patent No.: US 6,401,154 B1
(45) Date of Patent: Jun. 4, 2002

(54) FLEXIBLE ARCHITECTURE FOR AN EMBEDDED INTERRUPT CONTROLLER

(75) Inventors: Kenny Kok-Hoong Chiu; Michael S. Quimby, both of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/566,205

(22) Filed: May 5, 2000

(51) Int. Cl.[7] .............................................. G06F 13/24
(52) U.S. Cl. ...................... 710/260; 710/266; 710/300
(58) Field of Search ................................ 710/260–266, 710/300

(56) References Cited

U.S. PATENT DOCUMENTS 4,438,492 A * 3/1984 Harmon, Jr. et al.
6,163,826 A * 12/2000 Khan et al. ................ 710/107

OTHER PUBLICATIONS

*Elan™SC400 and ElanSC410 Microcontrollers User'Manual*, Advanced Micro Devices, Inc., ©1997, pp. 10–1 through 10–10.
*The Indispensable PC Hardware Book*, Hans–Peter Messemer, Third Ed., ©1997, table of contents and pp. 521–547, 659–680.
*ISA Systems Architecture*, Tom Shanley & Don Anderson, 1995, table of contents and pp. 29–37, 334–475.
*82C54 CHMOS Programmable Interval Timer*, Intel Corporation, Sep. 1993, pp. 5–24 through 5–29.
*82C59A–2 CHMOS Programmable Interrupt Controller*, Intel Corporation, Oct. 1988, pp. 5–45 through 5–52.
*Elan™ SC400 and Elan SC410 Single–Chip, Low–Power, PC/AT–Compatible Microcontrollers*, Data Sheet, Advanced Micro Devices, Inc., Dec. 1998, pp. 1 through 132.
*Elan™ SC410 Microcontroller*, Product Brief, Advanced Micro Devices, Inc., ©1999, 3 pages, http://www.amd.com/products/lpd/elan410/21328a.html.

* cited by examiner

Primary Examiner—Rupal Dharia
(74) Attorney, Agent, or Firm—Akin, Gump, Strauss, Hauer & Feld LLP (57) ABSTRACT

A programmable interrupt controller arrangement is provided including a multiple number of selectably enabled programmable interrupt controllers along with a multichannel switch matrix. A scalable number of interrupt sources can be routed to any particular interrupt request line. In addition, from the same architecture, multiple interrupt sources are allowed to share any one of the interrupt request lines. Interrupt signals are routed via the switch matrix under software control. PC/AT compatibility is achieved by selectively disabling certain of the programmable interrupt controllers.

39 Claims, 8 Drawing Sheets

PC/AT-compatible system

Figure 3

PC/AT-compatible system

| | 7 | 6 | 5 | 4 | 3 | 2 | 1 | 0 |
|---|---|---|---|---|---|---|---|---|
| bit | NMI done | NMI enable | reserved | | | slave 2 global interrupt mode enable | slave 1 global interrupt mode enable | master global interrupt mode enable |
| reset | 0 | 0 | 0 | | | 0 | 0 | 0 |
| R/W | R/W | W | R/W | | | R/W | R/W | R/W | interrupt control register — 167

FLEXIBLE ARCHITECTURE FOR AN EMBEDDED INTERRUPT CONTROLLER

BACKGROUND OF THE INVENTION

1. Field of the Invention

This application relates to microcontroller architecture, and more particularly to a programmable interrupt controller.

2. Description of the Related Art

A typical interrupt controller has 8 input lines that take requests from one of 8 different devices. The controller then passes the request on to the processor, telling it which device issued the request (which interrupt number triggered the request, from 0 to 7). The original PC and XT systems had one of these controllers, and hence supported interrupts 0 to 7 only.

Starting with the IBM AT, a second interrupt controller was added to the system to expand it; this was part of the expansion of the ISA system bus from 8 to 16 bits. In order to ensure compatibility, the designers of the AT didn't want to change the single interrupt line going to the processor. So what they did instead was to cascade the two interrupt controllers together.

The first interrupt controller still has 8 inputs and a single output going to the processor. The second one has the same design, but it takes 8 new inputs (doubling the number of interrupts) and output its single feed into input line 2 of the first controller. If any of the inputs on the second controller become active, the output from that controller triggers interrupt #2 on the first controller, which then signals the processor.

SUMMARY OF THE INVENTION

Briefly, the illustrative system provides an interrupt controller with the flexibility to provide a PC/AT-compatible or non-PC/AT-compatible embedded environment. Multiple slave controllers together with a master controller are combined with a multi-channel routing switch matrix. Flexibility is provided through interrupt sharing and selective slave controller disabling. The switch matrix, under software control, directs the multiple interrupt signals from internal and external sources to any priority channel of the multi-stage interrupt controller. Configuration of the switch matrix may be performed upon initialization or during run time. The switch matrix, slave controllers and master controller cascade formation may be configured to utilize a large number of interrupt channels or alternatively, to operate under PC/AT compatibility using a reduced number of interrupt channels.

BRIEF DESCRIPTION OF THE DRAWINGS

A better understanding of the illustrative system can be obtained when the following detailed description of the disclosed embodiment is considered in conjunction with the following drawings, in which.

DETAILED DESCRIPTION OF PREFERRED EMBODIMENT

The following related patent applications are hereby incorporated by reference as if set forth in their entirety:

U.S. patent application Ser. No. 09/379,457, entitled FLEXIBLE MICROCONTROLLER ARCHITECTURE;

U.S. patent application Ser. No. 09/379,160, entitled BUFFER CHAINING;

U.S. patent application Ser. No. 09/379,015, entitled METHOD AND APPARATUS FOR OVERLAPPING PROGRAMMABLE ADDRESS REGION;

U.S. patent application Ser. No. 09/379,012, entitled GENERAL PURPOSE BUS WITH PROGRAMMABLE TIMING, filed concurrently;

U.S. patent application Ser. No. 09/378,873, entitled DIRECT MEMORY ACCESS CHANNEL CONFIGURABILITY SUPPORT;

U.S. patent application Ser. No. 09/379,020, entitled FLEXIBLE ADDRESS PROGRAMMING WITH WRAP BLOCKING; and U.S. patent application Ser. No. 09/379,019, entitled REDIRECTING I/O ADDRESS HOLES.

Figure 1:
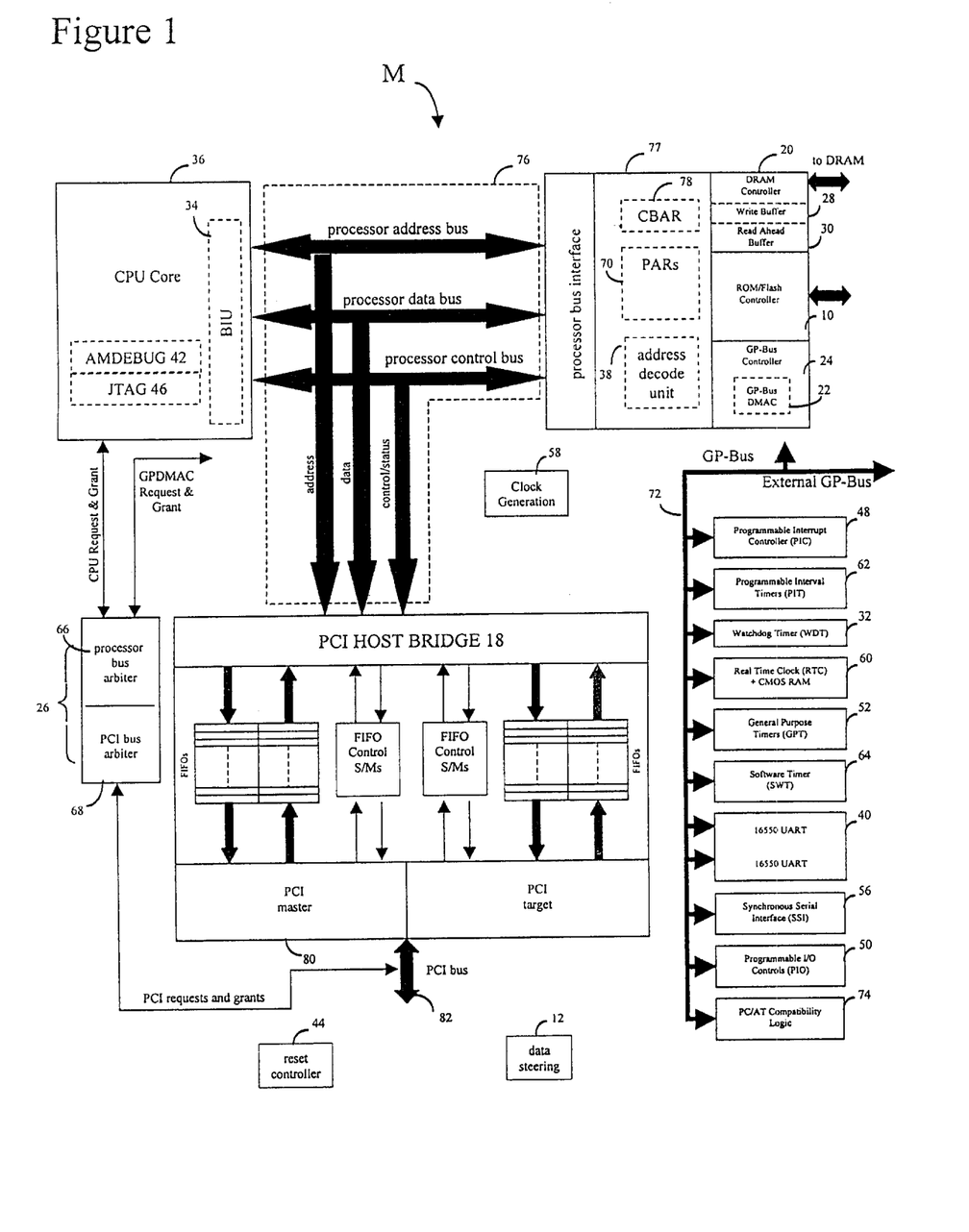
FIG. 1 is a block diagram of some elements of an exemplary microcontroller according to one embodiment.

Turning now to the drawings, FIG. 1 shows a typical microcontroller M in accordance with the present invention. The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16 K write back cache.

The microcontroller M provides Programmable Address Region (PAR) registers 70 that enable flexible placement of memory and peripherals into a memory address space and an I/O address space. The PAR registers 70 also allow control of important attributes like cacheability and write protection for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36 and PCI master controller 80, and external bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, a general purpose bus DMAC 22 and the PCI host bridge 18 on behalf of an external bus master requesting access to DRAM. The PCI bus arbiter 68 may arbitrate between five possible PCI masters.

A processor bus interface 77 is responsible for DMA cache snooping, dynamic clock speed adjusting, dynamic bus sizing, ready signal consolidation. Memory Mapped Configuration Region (MMCR) control and general purpose address control are performed by the ADU 38. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and supports up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 100 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second time-out with a 33 MHz CPU clock.

The PC/AT compatibility logic 74 provides PC/AT-compatible functions. The PC/AT compatible integrated peripherals include the DMA controller 22, the PIT 62, the PIC 48, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
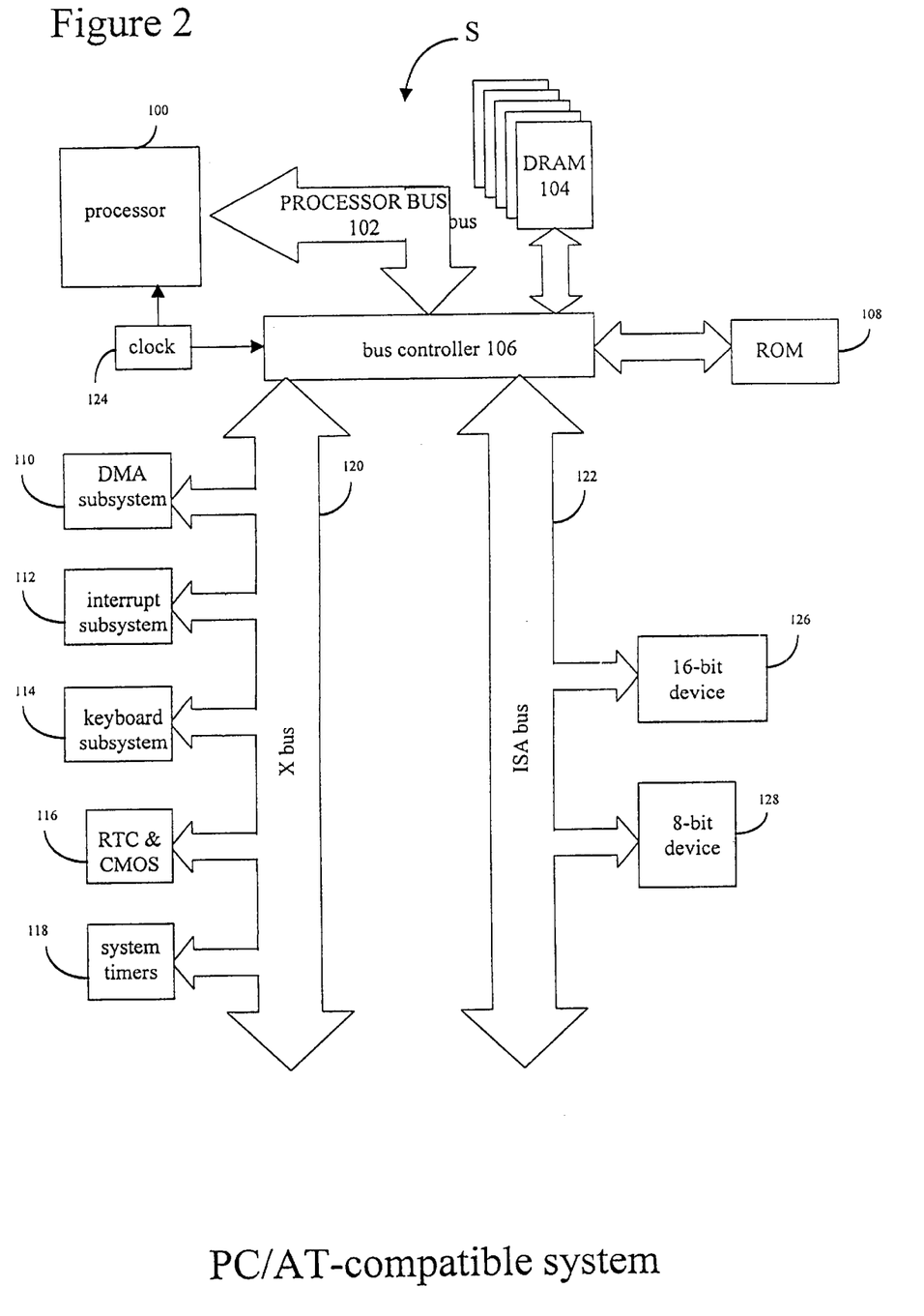
FIG. 2 is a detailed block diagram of the circuitry of the programmable interrupt controller of the microcontroller of the illustrative system according to one embodiment.

Before discussing the PC/AT-compatible features of the microcontroller M of FIG. 1, a brief introduction to PC/AT-compatibility is provided. FIG. 2 is a block diagram of a computer system S used to illustrate some of the basic hardware features of a PC/AT-compatible computer. First, a processor 100, also known as a microprocessor, is shown. PC/AT-compatible systems are based upon the Intel 8088 or compatible microprocessors. The 8086, 80286, 80386, 80486, and Pentium microprocessors are all considered PC/AT-compatible with the 8088 microprocessor.

FIG. 2 also shows a processor bus 102. The processor bus 102 connects the processor 100 to the other components of the computer system S and provides a pathway for address, data, and control signals to traverse. Also shown coupled to the processor bus 102 is a memory or DRAM 104. The DRAM 104 contains data such as, for example, instructions that the processor 100 executes.

Next, a bus controller 106 coupled to the processor bus 102 is shown. The bus controller 106 contains logic which enables the processor 100 to communicate with external devices. A ROM device 108 is shown coupled to the bus controller 106. The ROM 108 contains firmware instructions which are executed by the processor 100 when the computer system S is powered up.

A clock 124 is also shown as input to both the processor 100 and the bus controller 106. The clock 124 enables synchronization of these and other devices so that the processor 100 can communicate with other devices in the computer system S.

FIG. 2 shows two peripheral buses, an X bus 120 and an ISA bus 122. The X bus 120 is simply a buffered version of the ISA bus 122. As shown in FIG. 2, several components of PC/AT-compatible systems are connected to the system through the X bus 120. These components include a DMA subsystem 110, an interrupt subsystem 112, a keyboard subsystem 114, a real-time clock and CMOS RAM subsystem 116, and system timers 118.

Also shown as part of the computer system S is an ISA bus 122. ISA is an acronym for *Industry Standard Architecture*. Accordingly, the ISA bus 122 is a standard component of all PC/AT-compatible systems. The ISA bus 122 has several features, many of which are discussed below. A general function of the ISA bus 122 is to provide a mechanism for 8- or 16-bit devices to be added to the computer system S such that the devices may interact with its other circuitry. For example, an external device may need to interrupt the processor 100. Accordingly, the device needs to interact with the interrupt subsystem 112. Adherence to ISA bus 122 requirements makes such interaction possible. FIG. 2 shows a 16-bit device 126 and an 8-bit device 128 connected to the ISA bus 122. These devices may be either soldered on the system board or they may be connected via an ISA expansion slot connector. An example of an 8-bit device is a floppy disk drive controller while a fixed disk drive controller is a commonly used 16-bit device. Both are typically found in PC/AT systems.

The following sections describe particular requirements and implementations for PC/AT compatibility of the microcontroller M. For simplicity and clarity, requirements which are common across most computer system architectures are not described herein. Thus, for example, no mention is made of chip select signals, except where pertinent to discussing particular architectural requirements of a PC/AT-compatible system.

Programmable Interrupt Controller (PIC)

PC/AT Compatibility Requirements

In the PC/AT world, all hardware interrupts to a processor are channeled through two interrupt controllers. The interrupt controllers are Intel 8259A or their equivalent devices. The PC/AT architecture supports two cascaded 8259A PICs for a total of fifteen maskable interrupt request sources. The interrupt controllers are eight-input devices that can accept interrupt signals from several devices, assign priorities to each interrupt, and then interrupt the processor. Upon receipt of the interrupt, the processor automatically reads the particular interrupt controller to determine the source of the highest priority interrupt. Once determined, the processor calls the appropriate software interrupt routine.

Two interrupt controllers, a master and a slave, are used so that fifteen levels of interrupts are available. The INTR output of the slave is connected to the IR2 input of the master. This configuration enables the slave interrupt controller to interrupt the master interrupt controller to cause an interrupt. Although not required, typical PC/AT systems implement additional logic to allow programmable steering of the IRQs. The programmable interrupt controllers provide other features which are well-known to PC/AT system designers.

Figure 3:
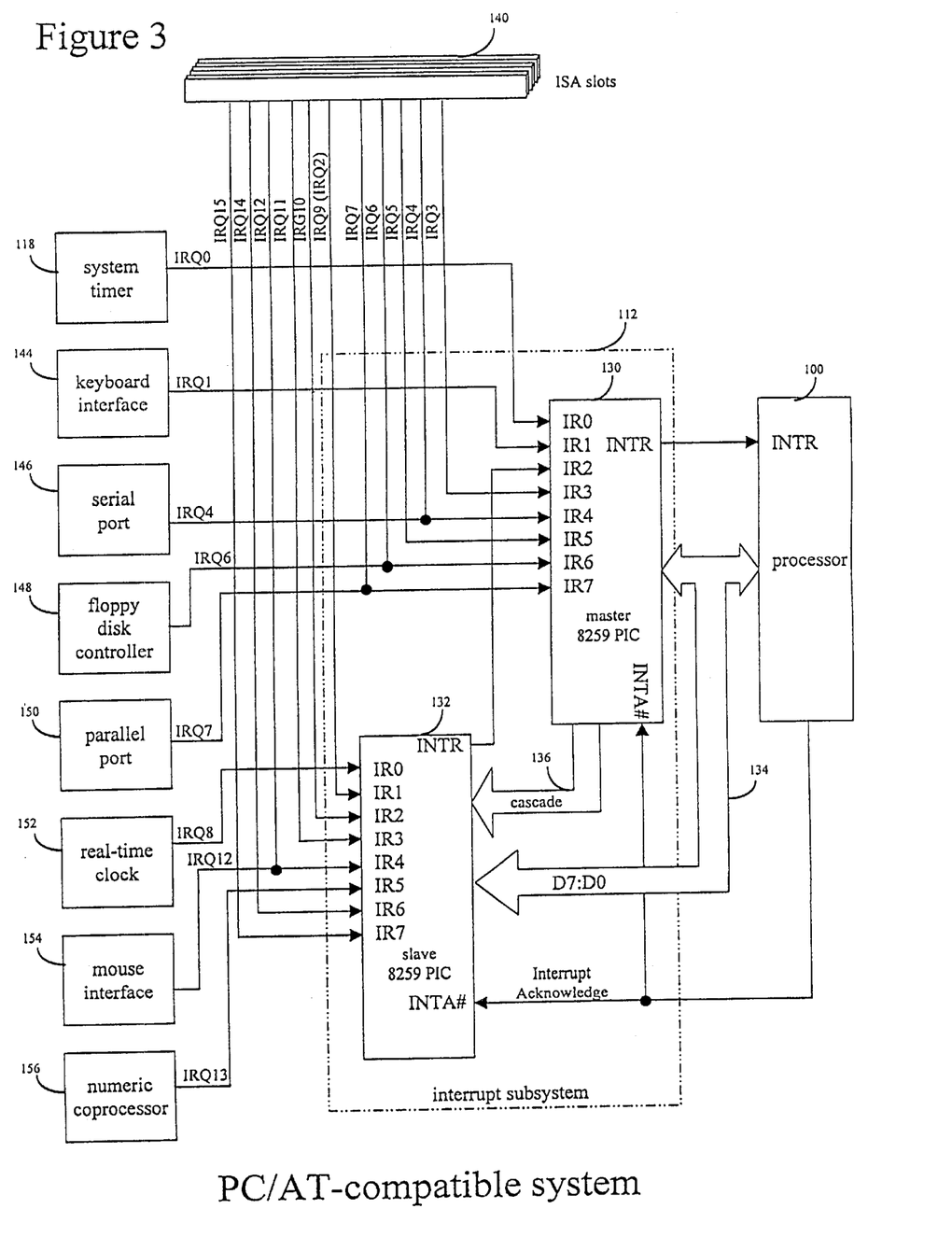
FIG. 3 is a block diagram illustrating the interrupt subsystem for a typical PC/AT computer system.

FIG. 3 is a block diagram illustrating the interrupt subsystem 112 for the PC/AT-compatible system introduced in FIG. 2. The interrupt subsystem 112 consists of two interrupt controllers: a master PIC 130 and a slave PIC 132. Together, the two PICs 130 and 132 receive interrupts from a variety of resources in the system S. The eight interrupts coming in from the slave PIC 132 produce a single INTR signal which in this case goes to the IR2 line of the master PIC 130, as FIG. 3 shows. In a PC/AT-compatible system, the interrupt priorities are assigned in ascending order. That is, IR0 has a higher priority than IR1 and IR2, and so on. Because the eight interrupts from the slave PIC 132 interrupt the IR2 line of the master PIC 130, all eight of the slave interrupts have higher priority than IR3 through IR7 of the master PIC 130.

As FIG. 3 shows, the interrupt inputs are labeled IRQ0 through IRQ15, for a total of sixteen interrupts for the two PICs 130 and 132. However, the INTR output from the slave PIC 132 is an input to IR2 of the master PIC 130. Therefore, only fifteen IRQ interrupts are available. In PC/AT-compatible systems, the fifteen available interrupts are assigned to particular logic of the computer system S.

In PC/AT-compatible systems, the IRQ0 is received from a system timer 118, as FIG. 3 shows. IRQ1 is provided by a keyboard interface 144. IRQ2 is cascaded from the slave controller 132. IRQ3 and IRQ4 are each assigned to a serial port in PC/AT-compatible systems. In FIG. 3, however, the IRQ3 and IRQ4 inputs are shown tied to ISA slots 140. The ISA slots 140 permit one or more external serial cards to be connected to the computer system S. The serial card(s) may then be assigned the IRQ3 or IRQ4 inputs to the master interrupt controller 130, as desired. The IRQ4 input is also shown connected to a serial port 146. An integrated serial port 146 is generally a part of a PC/AT-compatible system.

Next, the IRQ5 input is received from the ISA slots 140. IRQ5 is reserved in PC/AT-compatible systems for connection to a parallel port. The IRQ6 input is received from a floppy disk controller 148. Like IRQ4, the IRQ6 input is also connected to the ISA slots 140, allowing for an external floppy disk controller to be connected to the computer system S as desired. The IRQ7 input is from a parallel port 150. Again, the IRQ7 line is also connected to the ISA slots 140 for expandable options.

The next eight interrupts, IRQ8 through IRQ15 are inputs to the slave PIC controller 132. First, the IRQ8 input is received from a real-time clock 152. IRQs 9, 10, 11, 14 and 15 are all shown coming in from the ISA slots 140. These interrupts can be coupled to any 8- or 16-bit ISA devices.

In PC/AT-compatible systems, the IRQ12 input is received from a mouse interface 154 while the IRQ13 input is received from a numeric co-processor 156. Thus, FIG. 3 is an illustrative representation of how the fifteen available interrupts into both the master and slave interrupt controllers 130 and 132 are organized in PC/AT-compatible systems.

Exemplary Implementation

The microcontroller M of the illustrative system provides a highly programmable architecture which grants its customers the option to enable PC/AT functionality. The microcontroller M provides three 8259A programmable interrupt controllers. The PICs for the microcontroller M can be configured as either a stand-alone master controller, one slave cascade, or cascading with both slave controllers. The flexible architecture thus provides embedded system designers the ability to utilize the twenty-two interrupts available using the three 8259A PICs, to program two of the PICs for PC/AT functionality, or to disable both slaves, leaving only eight available interrupts, as desired.

Figure 4:
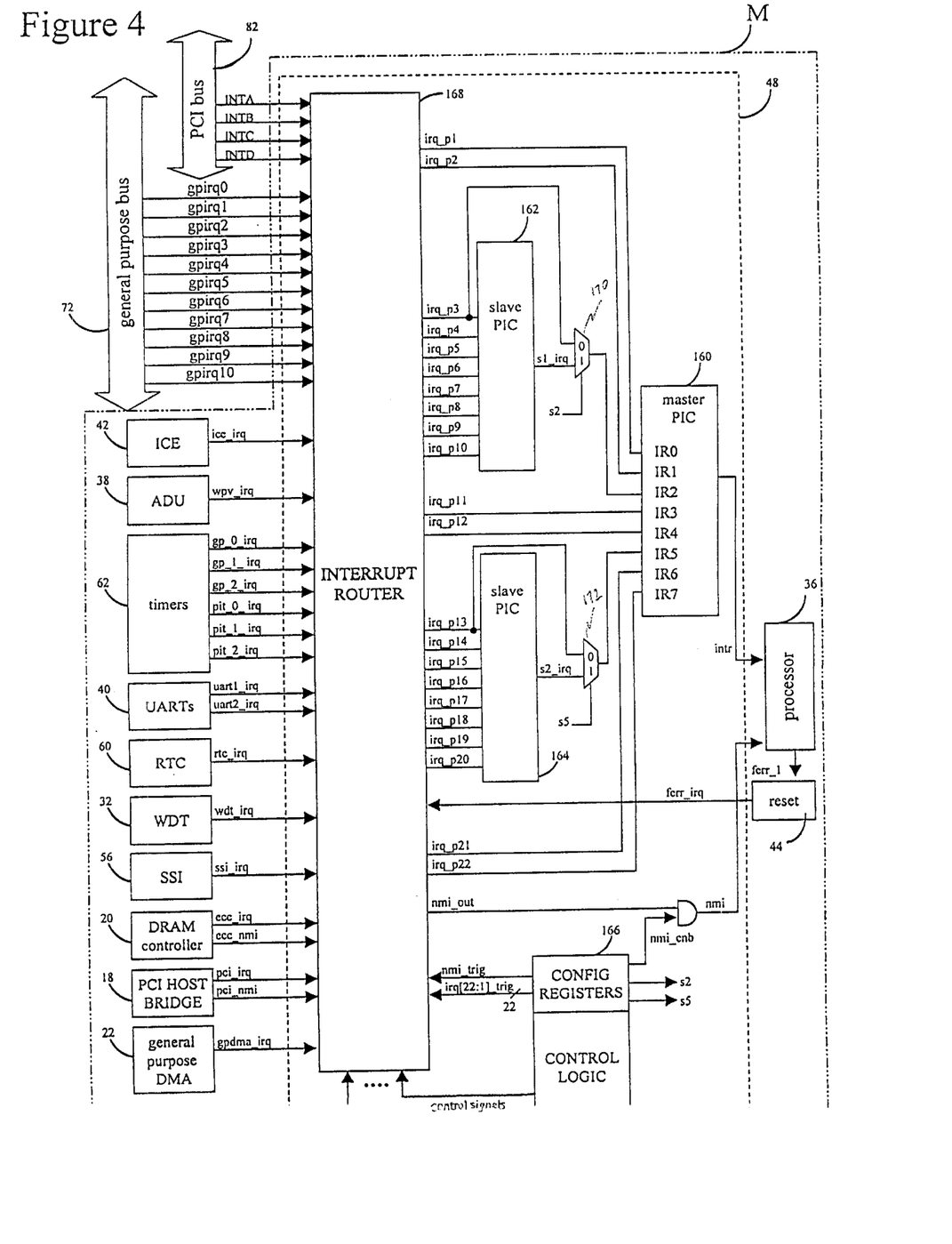
FIG. 4 is a block diagram illustrating the interrupt subsystem for an exemplary microcontroller according to one embodiment.

FIG. 4 is a block diagram of the programmable interrupt controller 48 introduced in FIG. 1 as part of the microcontroller M. The PIC 48 consists of three industry standard programmable interrupt controllers integrated together with a highly programmable interrupt router. Accordingly, FIG. 4 shows a master PIC 160, a slave PIC 162, a second slave PIC 164, and an interrupt router or channel switch matrix 168. The two industry standard PICs 162 and 164 are cascaded as slaves to the master PIC 160. The master PIC 160 arbitrates interrupt requests from various sources to the CPU 36. The programmable interrupt router 168 handles routing of the various external and internal interrupt sources to the twenty-two interrupt channels of the three PICs 160, 162 and 164. Specifically, the PIC 48 is able to handle more interrupt sources than available interrupt priority channels.

Interrupt Router/Switch Matrix

The interrupt router 168 may receive interrupts from either sources external to the microcontroller M or those internal to the microcontroller M. The external sources include devices connected to the PCI bus 82 or the general purpose bus 72. Additionally, the interrupt router 168 may receive interrupts from internal sources including the ICE 42, the address decode unit 38, the programmable interval timers 62, the UARTs 40, the real-time clock 60, the watchdog timer 32, the synchronous serial interface 56, the DRAM controller 20, the PCI host bridge 18, and the general purpose DMA controller 22.

Figure 6:
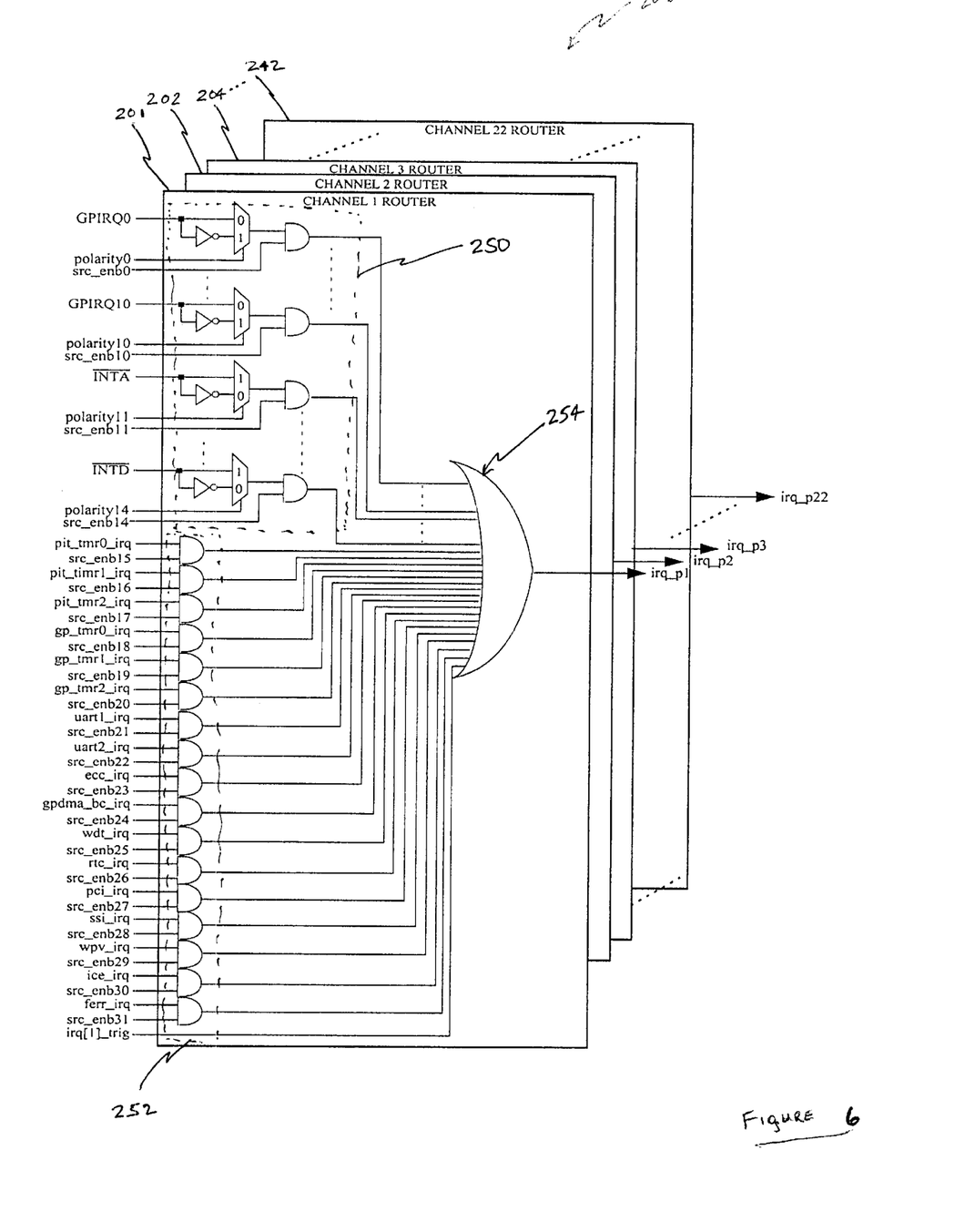
FIG. 6 is a detailed schematic of the interrupt router of FIG. 4.

The interrupt router 168 is implemented in hardware as combinatorial logic and is used to route any of the interrupt sources (both internally generated or externally generated), to the individual interrupt priority channels P1–P22 under software control. Once routed, the interrupt sources are output from the interrupt router 168 as irq_p1–irq_p22 to the interrupt priority channels for arbitration. Signal intr will be presented to the processor 36 from the master PIC 160 as an interrupt request. FIG. 6 shows the logical implementation of the switch channel matrix or router 168 which consists of logically ORing, represented by the scalable OR gate 254, all the interrupt sources possible for each of the 22 channels.

The interrupt vector to the processor 36, not shown in FIG. 4, is transmitted through the general purpose bus 72 connecting the peripherals to the processor 36. Signal irq [22:1]_trig are the internally generated hardware interrupts from interrupt trigger bits. Each channel has its own interrupt trigger bit. Another embodiment would provide a reduced number of internally generated hardware interrupt bits (instead of one per channel) that could be used to route to the interrupt priority channels. One skilled in the art can understand that this architecture is not limited to the shown number of interrupt sources.

From FIG. 6, each internally generated hardware interrupt source has its own enable bit, which can be cleared through software to gate the interrupt at the polarity inversion logic 250 or the AND gate array 252 from causing an interrupt request output over the irq_p1–irq_p22 output signal lines. Also, this architecture allows sharing of interrupt sources with respect to a particular interrupt channel. The OR gate 254 associated with each of the 22 channel routers 201–222, collectively a crossbar switch, allow sharing by mapping multiple interrupt sources to the interrupt channels. Sharing is one manner that allows routing of more interrupt sources than available interrupt priority channels. Level sensitive sharing is typically implemented by tying multiple interrupt outputs using an open drain or open collector output to a single interrupt input pin. However, interrupt sharing may be easily configured, according to the present embodiment, by the aforementioned mapping scheme illustrated in FIG. 6. Interrupt sharing is preferred for level sensitive interrupts and not edge-triggered interrupts. Edge triggered interrupts are not recommended to be shared because it is difficult to keep track of the number of edges being generated to signify interrupt requests. Furthermore, glitches which can occur so frequently on these lines (due to asynchronous nature of most PC interrupt controllers) are difficult to differentiate with real interrupt signals. Level sensitive interrupts can be shared as the interrupt remains active before the end-of-interrupt is performed and thus is easily recognizable. In edge triggered interrupts, this information is lost.

Returning to FIG. 5, the interrupt control register 167 controls the global interrupt mode (edge vs. level) for the master 160, slave 1 162 and slave 2 164 programmable interrupt controllers. According to an embodiment, bits [2:0]

control the global interrupt mode for each of the PICs. Each bit, along with the respective LTIM bit of PICICW1 register for the same PIC (see FIG. 5B), provides a global or individual channel interrupt mode for the respective PIC is set. If this bit is set and the LTIM bit cleared, all the PIC interrupt channels will recognize edge sensitive interrupt requests. If this bit is cleared, however, the PIC channels can be programmed individually to select either edge or level sensitive interrupt recognition. Bit 2 of this register controls slave 2 PIC global interrupt mode enable. Bit location [1] controls PIC global interrupt mode enable for slave 1 and bit location [0] controls the PIC global interrupt mode enable for the master PIC. According to one embodiment, for PC/AT compatibility, bits [1:0] should set together with bits S2(set) and S5(cleared) of register PIC ICW3 (see FIG. 5C). In such a case, slave 2 controllers bypass any interrupt sources mapped to slave 2 controller and should have no effect.

Externally generated interrupts e.g. $\overline{\text{INTA–INTD}}$ and $\overline{\text{GPIRQ0–GPIRQ10}}$ go through the polarity inversion logic 250 to further provide flexibility in the architecture to accommodate different types of interrupt sources. For example, a PCI generated interrupt request that is active low must be inverted using this programmable inversion logic 250 prior to reaching the interrupt priority channel to which it is mapped before the controller can recognize a valid interrupt request. All internally-generated interrupt signals may have the correct active high polarity and therefore do not require inversion. Although this embodiment is described in connection with the cascaded interrupt controller architecture, it should be understood this same concept may be extended with only minor modification to any interrupt controllers that recognize either fixed active (high or low) interrupt requests or fixed edge-triggered (low-to-high or high-to-low) interrupt requests.

It should also be understood that the architecture is easily scalable to accommodate more than the number of interrupt sources shown simply by widening the channel switch matrix 168. Specifically, since the interrupt sources are routed through a simple OR device, additional interrupt sources can be added without significant changes in the hardware design. A modification to the AND gate array 252 (FIG. 6) and, if an active low interrupt is used, a modification to the polarity inversion array 250 could easily be made to accommodate additional sources. Also, software control can easily be modified to gate the additional sources.

In FIG. 6, all of the thirty-two hardware interrupt sources are common to all the twenty-two channel routers 201–222. The individual bits of polarity [14:0] per external interrupt source is also common to all the channel routers 201–222. The decoder for the enable signals is not shown; only the decoded representation of the signals is shown. Those skilled in the art are generally familiar with the design of decoders when given an encoder design. Each channel crossbar switch matrix 201–222 has its own unique internally generated hardware interrupt trigger irq[1]_trig–irq[22]_trig.

Figure 7:
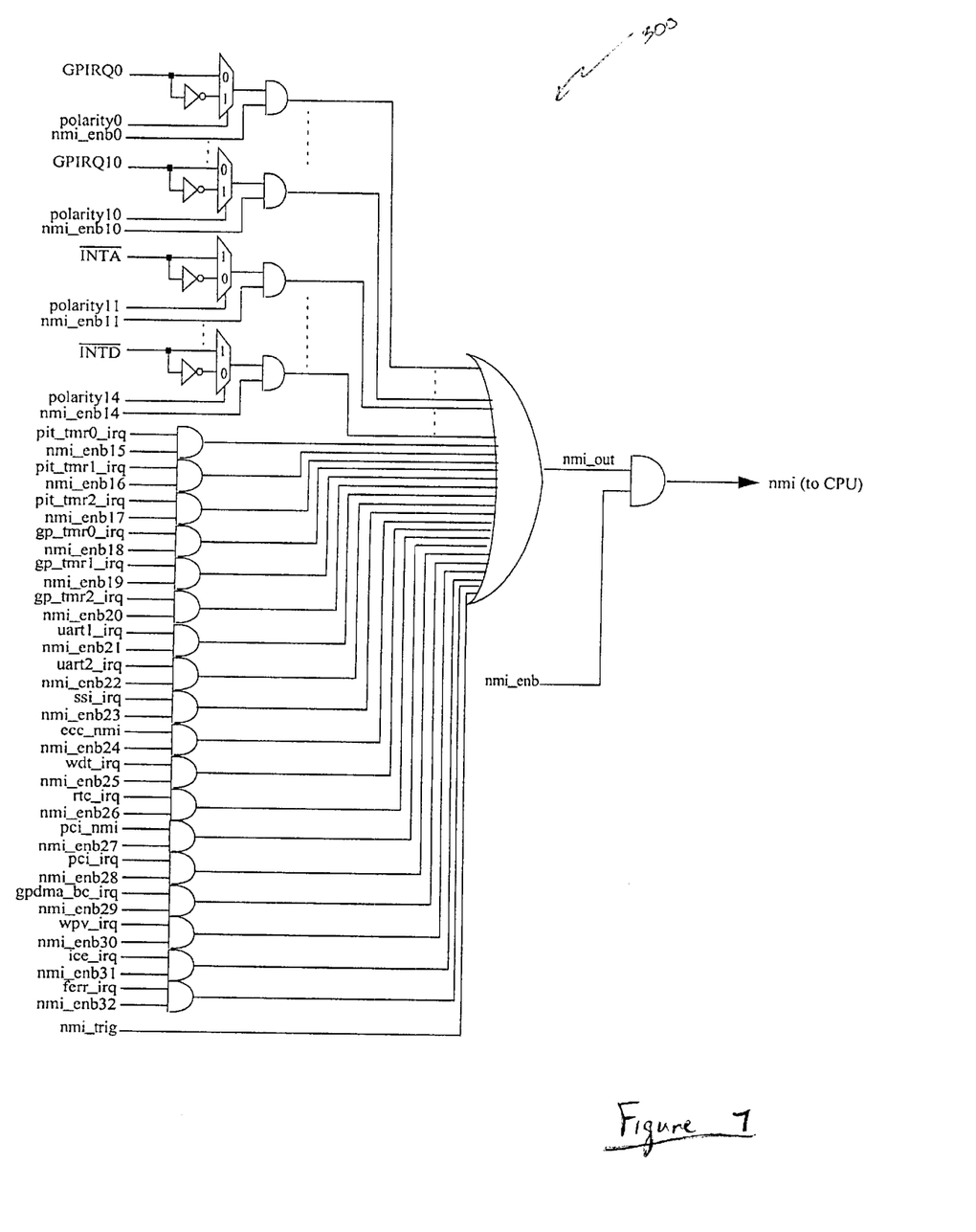
FIG. 7 is a detailed schematic of a non-maskable switch matrix of the interrupt router of FIG. 4.

Turning to FIG. 7, there is also a non-maskable interrupt (NMI) switch matrix 300 for all the interrupt sources. Signal nmi_trig is an internally generated NMI trigger bit which can be used to generate an NMI under software control. FIG. 7 shows the logical OR function of this switch matrix, similar to the channel routers 201–222. Signal nmi is preconditioned to be synchronous to the processor clock before being presented to the processor 36 and the circuit is not shown. Similarly, this architecture can be scaled to accommodate more NMI sources than what is shown by widening the NMI switch matrix 300. NMI sharing is possible with this architecture but is preferred for level sensitive NMI requests.

The polarity control signal per external interrupt source is common to those used across the channel switch matrices. The NMI enable bits for each source are enabled/disabled under software control.

PC/AT Compatibility

The PIC 48 of the microcontroller M is designed to support PC/AT compatibility. In this respect, the programmable interrupt router 168 may be configured at startup or during normal operation to appropriately route ISA interrupt signals to the corresponding interrupt channels of the slave PICs 162 and 164 and the master PIC 160. Table 1 below shows the interrupt channel assignment for PC/AT-compatible systems and the corresponding interrupt of the microcontroller M. These channel assignments are implemented in software, typically during BIOS initialization.

TABLE 1

PC/AT interrupt channel assignment for the microcontroller M

| IRQ No. | I/O device | microcontroller M interrupt source |
|---|---|---|
| IRQ0 | System Timer( ) | Internal via pit_0_irq |
| IRQ1 | Keyboard Interface | External via General Purpose IRQ pin |
| IRQ2 | Slave1 cascading | Cascaded from Slave Controller |
| IRQ3 | Serial Port 2 | Internal via uart2_irq |
| IRQ4 | Serial Port 1 | Internal via uart1_irq |
| IRQ5 | Parallel Port 2 | External via General Purpose IRQ pin |
| IRQ6 | Floppy Disk Controller | External via General Purpose IRQ pin |
| IRQ7 | Parallel Port 2 | External via General Purpose IRQ pin |
| IRQ8 | Real Time Clock | Internal via rtc_irq |
| IRQ9 | Any 8 or 16 bit ISA device | External via General Purpose IRQ pin |
| IRQ10 | Any 8 or 16 bit ISA device | External via General Purpose IRQ pin |
| IRQ11 | Any 8 or 16 bit ISA device | External via General Purpose IRQ pin |
| IRQ12 | Mouse Interface | External via General Purpose IRQ pin |
| IRQ13 | Numeric Co-processor | Internal via ferr_irq |
| IRQ14 | Any 8- or 16-bit ISA device | External via General Purpose IRQ pin |
| IRQ15 | Any 8- or 16-bit ISA device | External via General Purpose IRQ pin |

Returning to FIG. 4, a multiplexor 170 and 172 is implemented at the output of each slave controller 162 and 164 to provide PC/AT compatibility. When signals s2 and s5, control signals for the multiplexors 170 and 172, are set and cleared respectively under software control, PC/AT compatibility could be maintained whereby the outputs of slave 1 controller is cascaded onto IR2 input of master controller respectively and slave 2 controller is disabled. Different master and slave(s) configurations could be programmed depending on the signals s2 and s5.

Additional embodiments exist to provide further flexibility. One alternate embodiment is to provide another level of switch matrix between the slave controllers 170 and 172 and the master controller 160. This allows routing the output of each slave to any input of the master controller under software control. This additional switch matrix would be implemented in much the same way as the interrupt router 168. Specifically, through minimal additional software control, additional interrupt trigger bits associated with the priority interrupt signals output from the slave controllers 170 and 172 could be used to route certain interrupt sources from the slave controllers to any selected input to the master controller. Software control would continue to maintain PC/AT compatibility by ensuring the PC/AT priority scheme. Another embodiment would require additional hardware i.e. increased additional slave controllers which would effectively increase priority interrupt channels to the entire system up to a maximum of 64 priority interrupt channels by using 8 slave controllers cascaded onto master controller. This would allow systems to take advantage of a significant increase the number of interrupt sources possible.

Also shown in FIG. 4 is a set of configuration registers 166 coupled to the interrupt router 168. The configuration registers 166 control the PIC 48 of the microcontroller M. The configuration registers 166 include both memory-mapped and direct-mapped registers. The memory-mapped registers of the PIC 48 are mapped into the memory-mapped configuration register space of the microcontroller M. Among other functions, these registers control the interrupt mapping for both the internal peripheral sources listed above and for external sources connected to the buses 72 and 82. The direct-mapped registers are accessible in the PC/AT I/O address space of the microcontroller M. Refer to Table 2, below, for particular I/O port assignments for a PC/AT-compatible system.

FIG. 5A is a block diagram of one of the memory-mapped registers of the microcontroller M known as an interrupt control register 167. The bottom three bits control the global interrupt mode enable feature for each of the master 160, the slave 162, and the slave 164. For example, if bit 0 of the interrupt control register 167 is set, the global interrupt mode for the master PIC 162 is enabled. The global interrupt mode allows the individual controller to either recognize the edge or level sensitive interrupts (at its 8 inputs) either globally or individually. For PC/AT compatibility, bits 1 and 0 of the interrupt control register 167 are set, while bit 2 is cleared. Upon power-on-reset, these bits are 'set' to further maintain PC/AT compatibility.

Configuration/Initialization

Figure 5:
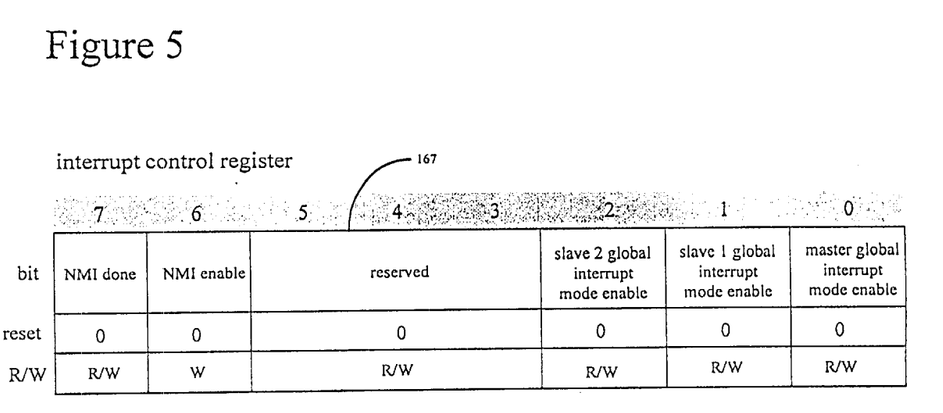
FIGS. 5A–5C are block diagrams of configuration registers of an exemplary microcontroller according to one embodiment.

The PIC 48 includes a set of configuration registers 166, as shown in FIG. 5. These registers include an interrupt request register, in-service registers, interrupt mask register, four initialization control words, and 2 operation control words per controller.

The register names are:

| Master Controller | Slave Controller 1 | Slave Controller 2 |
|---|---|---|
| MPICICW1 | S1PICICW1 | S2PICICW1 |
| MPICICW2 | S1PICICW2 | S2PICICW2 |
| MPICICW3 | S1PICICW3 | S2PICICW3 |
| MPICICW4 | S1PICICW4 | S2PICICW4 |
| MPICOCW2 | S1PICOCW2 | S2PICOCW2 |
| MPICOCW3 | S1PICOCW3 | S2PICOCW3 |
| MPICOCW1 | S1PICOCW1 | S2PICOCW1 |
| (also known as Int$^r$ mask register) | (also known as Int$^r$ mask register) | (also known as Int$^r$ mask register) |

FIGS. 5B and 5C illustrate the various configuration registers of an embodiment. These will be described in the context of the master controller. Minor differences exist for analogous slave controller registers. Turning specifically to FIG. 5B shown are 4 of the 7 configuration registers. The master PIC initialization control word 1 (MPICICW1) is the first initialization register of the master controller. For simplicity, the discussion of the registers of FIGS. 5B and 5C will discuss only bit locations of primary importance to the subject matter herein. Bit location [3] sets the level triggered interrupt mode. If bit [3] is set to zero, edge sensitive interrupt detection is enabled and if set to 1, level sensitive interrupt detection is enabled. Bit location [1], SNGL sets the single PIC mode. Specifically, set to 0, the system is configured in a cascade mode, while if set to 1, only a single PIC system is enabled. Setting this bit to 1 then will logically remove slave 1 and slave 2 controllers from the master PIC. In routing the interrupt request from slave 1 and slave 2 directly to IR2 and IR5 of the master PIC respectively. Continuing, the master PIC operation controller 2 (MPICOCW2) is the register providing control for various interrupt priority control and end of interrupt of modes. Bits [2:0] set the specific end of interrupt level select. Binary values 000–111b select for IRQ0–IRQ7 respectively. Master PIC operation controller 3 (MPICOCW3) provides control for IRR/ISR register reads, master and poll modes. Master PIC initialization control word 2 (MPICICW2) is the second initialization register of the master controller. Bit locations [7:3] identify the base interrupt vector number. For example, these bits will be programmed to 00001b for the master PIC (IRQ0 generates INT8), and 01110b for the slave PIC (IRQ8 corresponds to INT 70h) in a PC/AT compatible system. Further, bit locations [2:0] represent bit locations A10 through A8 of the interrupt vector. These bits are always 0 in a PC/AT compatible system.

Turning to FIG. 5C, additional configuration registers are shown. The master PIC initialization control word 3 (MPICICW3) is the third initialization register of the master controller. This register controls the slave cascading configuration for the various interrupt channels. For each bit location, a 0 couples the respective device to the respective IRQ input. When bit location is set to 1, then the respective IRQ input is used for slave cascading. If bits 2 and 5 of this register are cleared, both slave controllers are logically removed from the cascade chain to the master controller and only 8 interrupt request priority levels are available to the user. Continuing, the master PIC initialization controller 4 (MPICICW4) is the fourth initialization register of the master controller. Initialization of this register is optional unless bit location [0] of register MPICICW1 is set. Continuing, the master PIC interrupt mask (MPICINTMSK) provides masking of individual interrupt request for the master controller. A 0 value in any bit location unmasks the respective IRQ signal. Alternatively a 1 in a bit location masks the respective interrupt input.

A set of such registers is available for each controller 160, 162, and 164. Additional registers could be added to the system with only minor modification for applications involving more than two slave controllers, as discussed above. These are direct-mapped registers assigned to I/O ports 20h–21h for the master PIC 160, 24h–25h for the slave PIC 164, and 0A0h–0A1h for the slave PIC 162 of the microcontroller M. The I/O port assignments for the master PIC 160 and the slave PIC 162 for the microcontroller M correspond to the I/O port assignments required for PC/AT compatibility.

The initialization of the PIC 48 consists of writing a sequence of two to four bytes to each of the master PIC 160, the slave PIC 162, and the slave PIC 164. The first initialization byte is written to the lower address of each interrupt controller (020h for the master 160, 0A0h for the slave 164, and 024h for the slave 162). All subsequent initialization bytes are written to the upper address of the interrupt controllers (021h for the master 160, 0A1h for the slave 164, and 025h for the slave 162). Hardware programmers of ordinary skill will recognize this programming sequence as preferred for 8259 and 8259-compatible interrupt controllers.

TABLE 2

Configuring the PIC 48 of the microcontroller M

| in general | PC/AT-compatible system | | PC/AT programming example |
|---|---|---|---|
| for master 160, slave 162, and slave 164: | for master 160 and slave 162: | | (master 160 uses I/O 20h and 21h slave 162 uses I/O A0h and A1h) |
| 1. initialize ICW1 | ICW1[1] = 0b | | 20h = 15h<br>A0h = 15h |
| 2. initialize ICW2 with vector offset value | master<br>slave | ICW2 = 08h<br>ICW2 = 70h | 21h = 08h<br>A1h = 70h |
| 3. initialize ICW3 if ICW1 was set for cascaded PICs | Master | ICW3[2] = 1b<br>ICW3[5] = 0b | 21h = 04h<br>A1h = 02h |
| | Slave | ICW3 = 02h | |
| 4. initialize ICW4 only if ICW1 provides for | ICW4[1] = 0b<br>ICW4[4] = 0b | | 21h = 01h<br>A1h = 01h |

Table 2 shows how the PIC 48 of the microcontroller M may be configured for either a PC/AT-compatible system or for a non-PC/AT-compatible system. Up to four initialization control words, denoted ICW1, ICW2, ICW3, and ICW4, may be programmed for each of the master controller 160, the slave controller 162, and the second slave controller 164. An optional 3 operation control words can also be programmed after the four initialization control words are performed for each controller to further configure the controllers.

First, the ICW1 register is initialized. This initialization byte notifies the relevant PIC (master 160, slave 162, or slave 164) that an initialization sequence is commencing. The ICW1 register also controls the type of interrupt triggering (edge- or level-sensitive), whether or not the relevant PIC 160, 162, or 164 is in a cascaded environment or alone, and whether the fourth initialization control word (ICW4) is required. For PC/AT-compatible interrupt control, bit 1 of the ICW1 is set to a zero. Accordingly, the third column of Table 2 shows programming examples for programming the ICW1 register for both the master 160 and one slave 162.

Next, the ICW2 register is initialized. This register contains the vector offset for the relevant PIC 160, 162 or 164. For PC/AT-compatible systems, the ICW2 register for the master PIC 160 contains an 08h while the ICW2 register for the slave PIC 162 contains a 70h, as Table 2 shows. Third, the ICW3 register is initialized. The ICW3 register is initialized only if the ICW1 register was programmed to cascade one or more interrupt controllers. Programming the ICW3 register identifies which IR inputs of the master PIC 160 are hooked up to the slave PICs 162 and 164. Looking back to FIG. 4, the slave PIC 162 is input to the master PIC 160 at IR2. The slave PIC 164 is input to the master PIC 160 at IR5. Thus, in a PC/AT-compatible implementation of the microcontroller M, bit 2 of the ICW3 register is set while bit 5 of the ICW3 register is cleared, since a single slave PIC 162 is sufficient for PC/AT compatibility.

Next, Table 2 shows that the ICW4 register is initialized. The ICW4 register configures the relevant PIC for special fully nested mode, buffered mode, automatic end of interrupt mode, and microprocessor mode. An optional 30CW registers can be programmed to further configure the P1 controllers.

For PC/AT compatibility, any interrupt sources used in the system must be mapped to the appropriate interrupt priorities outlined in table 1 via the interrupt mapping registers residing in CONFIG REGISTERS 166 of FIG. 4.

In addition to the registers shown in Table 2, an interrupt control register 167 of FIG. 5, one of the many memory-mapped registers of the microcontroller M, is programmed for PC/AT compatibility by setting bits 1 and 0 of the register. These bits provide control for global or individual channel interrupt mode control for each of the controllers. For PC/AT compatibility, all the 8 channels are controlled globally to either recognizing level sensitive or edge sensitive interrupts on all its input. These bits default to 'set' upon power-on-reset which maintains PC/AT compatibility, for example the register of FIG. 5.

Thus, the PIC 48 of the microcontroller M allows embedded system designers to program the PIC 48 for PC/AT compatibility. In this case, only one of the slave controllers is cascaded to the master controller 160 via input IR2. The second slave controller is logically removed from the master controller 160 and the highest priority channel originally hooked to the second controller is now automatically routed to input IR5 of the master controller 160, thereby preserving the architecture of the PC/AT interrupt controller. Alternatively, embedded system designers may fully utilize the twenty-two available interrupts of the PIC 48 for other applications, as desired.

The programmable interrupt controller consists of a system of three individual interrupt controllers (Master, Slave 1 and Slave 2), each of which has eight interrupt channels. The interrupt controller is implemented asynchronously. Two of the interrupt channels on the Master controller are used to cascade the slave controllers. This allows a total of 22 interrupt priority levels in the ElanSC520 microcontroller. The priority levels are numbered from P1–P22 to indicate which priority levels are assigned to slave or master controllers, with P1 being the highest and P22 being the lowest priority.

Figure 8:
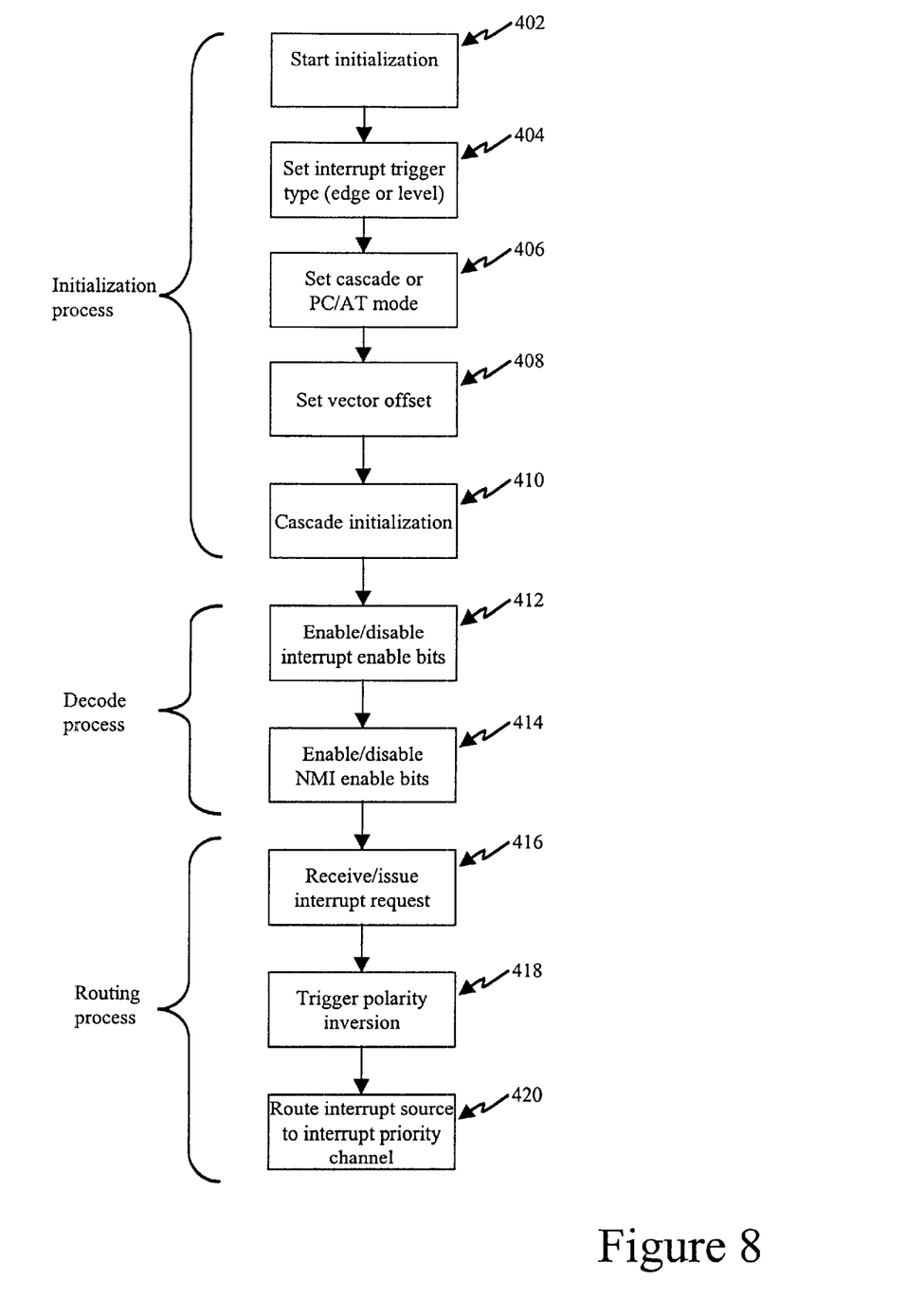
FIG. 8 is a flow diagram of an exemplary configuration process.

Turning now to FIG. 8, shown is an example of an interrupt flow sequence through the PIC 48. The initialization process begins at step 402 upon initial configuration. However, it should be understood that the programmable nature of the components involved, including the interrupt router 168, as well as the slave and master PICs 162, 164 and 160, allow for run-time programming of the interrupt routing process. Continuing at step 404, either edge-sensitive or level-sensitive interrupt trigger type is set. As discussed above, this provides flexibility in allowing compatibility with any number of various interrupt sources. At step 406, PC/AT mode can be enabled under software control by setting a particular cascade mode configuration. PC/AT compatibility generally requires that only one of the multiple slave PIC devices be enabled. Continuing, software may then set the vector offset at step 408. If set at step 406, the particular cascade configuration is then initialized at step 410. Of course, the particular initialization process herein described, may be performed through sequences other than that described in connection with FIG. 8.

Continuing, at step 412, the active interrupt sources are mapped to proper interrupt priority channel. At step 414, necessary polarity inversion configuration is programmed for certain active low requests input. The decoding process continues to step 416 where the various enable bits and associated enable signals including the non-maskable interrupt signals are set to activate a particular internet source on a per channel router 201–222 basis. At step 418, certain of the interrupt priority channels are unmasked. This is done via the interrupt mask register in the individual master and slave controllers. Finally at step 420, the channel router is ready to receive a issued interrupt request.

Asynchronous Operation

It can be noted that this architecture lends itself well to asynchronous interrupt controllers since the combinatorial logic of the switch matrix will very likely generate glitches whenever there are interrupts active on the interrupt priority channels. This is acceptable since the interrupt controllers themselves are designed with accepting asynchronous interrupts which can be glitchy. There is no special hardware needed to pre-condition the interrupt signals feeding into the controllers. The enable bit for each interrupt source can be used to test the connectivity of the interrupt source to the priority channel at the system level. This applies to the NMI switch matrix as well. However, preconditioning of the NMI occurs synchronously before feeding into NMI pin of CPU because a timing requirements of CPU according to U.S. patent application Ser. No. 09/518,489, entitled MICROCONTROLLER INCLUDING A CPU HAVING EDGE-SENSITIVE NON-MASKABLE INTERRUPT (NMI) CIRCUITRY AND AN INTERRUPT CONTROL UNIT PROVIDING FOR NMI SHARING, herein incorporated by reference.

The foregoing disclosure and description of the various embodiments are illustrative and explanatory thereof, and various changes in the descriptions of the microcontroller and other circuitry, the organization of the components, and the order and timing of steps taken, as well as in the details of the illustrated system may be made without departing from the spirit of the invention.

What is claimed is:

1. An interrupt routing device, comprising:
   a programmable router to route interrupt signals from a plurality of interrupt sources to a plurality of interrupt request lines;
   a plurality of programmable interrupt controllers coupled to the programmable router by the interrupt request lines, a first set of programmable interrupt controllers of the plurality of programmable interrupt controllers being disabled in a PC/AT-compatible mode and a second set of programmable interrupt controllers of the plurality of programmable interrupt controllers being enabled in a non-PC/AT-compatible mode.

2. The interrupt routing device of claim 1, wherein the plurality of programmable interrupt controllers include a plurality of slave interrupt controllers for selecting among the interrupt request lines according to a predefined interrupt signal priority and a master interrupt controller for selecting among the selected interrupt request lines received from the plurality of slave interrupt controllers.

3. The interrupt routing device of claim 2, further comprising:
   an interrupt control register to selectively enable and disable programmable interrupt controllers of the plurality of programmable interrupt controllers in a PC/AT-compatible mode.

4. The interrupt routing device of claim 1, the programmable router further comprising:
   a plurality of channel routers to route one of the plurality of interrupt signals to an interrupt request line associated with a channel router of the plurality of channel routers, thereby forming an interrupt switch matrix, comprising:
      a selection circuit to selectably enable interrupt signals; and
      a logic circuit to direct enabled interrupt signals to the interrupt request line associated with the channel router.

5. The interrupt routing device of claim 4, wherein the interrupt signals are enabled according to predetermined values of interrupt trigger bits associated with each interrupt signal.

6. The interrupt routing device of claim 4, wherein the values of the interrupt trigger bits are set under software control.

7. The interrupt routing device of claim 2, further comprising:
   a router between the plurality of slave interrupt controllers and the master interrupt controller, the second interrupt switch matrix directing any of the interrupt request lines from any of the plurality of slave interrupt controllers to any input of the master interrupt controller.

8. The interrupt routing device of claim 4, the plurality of channel routers further comprising:
   a polarity inversion circuit coupled to a selected plurality of channel router inputs of the plurality of channel routers for inverting interrupt signals.

9. The interrupt routing device of claim 1, further comprising:
   a non-maskable interrupt channel router to route one of a plurality of non-maskable interrupt signals to a processor.

10. The interrupt routing device of claim 1, wherein only a master programmable interrupt controller and a slave programmable interrupt controller of the plurality of programmable interrupt controllers are enabled in a PC/AT-compatible mode.

11. The interrupt routing device of claim 1, wherein the plurality of programmable interrupt controllers comprise 8259-compatible programmable interrupt controllers.

12. The interrupt routing device of claim 1, the plurality of programmable interrupt controllers comprising:
    a master programmable interrupt controller and first slave programmable interrupt controller enabled in the PC/AT-compatible mode and a non-PC/AT-compatible mode; and
    a second slave programmable interrupt controller disabled in the PC/AT-compatible mode and enabled in the non-PC/AT-compatible mode.

13. The interrupt routing device of claim 1, wherein the programmable router provides for sharing of the interrupt and non-maskable interrupt sources on a single interrupt priority channel.

14. The interrupt routing device of claim 13, wherein the number of interrupt sources is more than the available number of interrupt priority channels.

15. The interrupt routing device of claim 13, whereby interrupt sharing is provided for both internally generated interrupts and externally generated interrupts.

16. The interrupt routing device of claim 1, wherein the plurality of interrupt sources are recognized as edge triggered in a edge triggered interrupt mode or as level triggered in a level triggered interrupt mode.

17. The interrupt routing device of claim 16, wherein the interrupt mode is selectable such that all of the interrupts are recognized as either edge triggered or level triggered in a global mode or individually recognized as either edge triggered or level triggered on a per interrupt source basis.

18. A method of configuring a programmable interrupt controller, the method comprising the steps of:
    enabling a master programmable interrupt controller;

selectively enabling none, one or more slave programmable interrupt controllers of a plurality of slave programmable interrupt controllers to generate a desired number of interrupt channels.

19. The method of claim 18, wherein the plurality of interrupt sources are recognized as edge triggered in a edge triggered interrupt mode or as level triggered in a level triggered interrupt mode.

20. The method of claim 19, wherein the interrupt mode is selectable such that all of the interrupts are recognized as either edge triggered or level triggered in a global mode or individually recognized as either edge triggered or level triggered on a per interrupt source basis.

21. The method of claim 18, wherein, for PC/AT compatibility, the master programmable interrupt controller is enabled and one slave programmable interrupt controller of the plurality of slave programmable interrupt controllers is enabled or disabled.

22. The method of claim 18, wherein for non-PC/AT compatibility, a master programmable interrupt controller is enabled and a combination of the other programmable interrupt controllers are enabled.

23. A flexible PC/AT-compatible microcontroller, comprising:
an x86-compatible processor;
a processor bus coupled to the x86-compatible processor;
a general purpose bus;
a general purpose bus controller coupled between the processor bus and the general purpose bus, the general purpose bus controller, comprising:
a means for configuring the general purpose bus to emulate an industry standard architecture-compatible bus;
a plurality of PC/AT peripheral devices;
a programmable router to route interrupt signals from a plurality of interrupt sources to a plurality of interrupt request lines; and
a plurality of programmable interrupt controllers coupled to the programmable router by the interrupt request lines, a first set of programmable interrupt controllers of the plurality of programmable interrupt controllers being disabled in a PC/AT-compatible mode and a second set of programmable interrupt controllers of the plurality of programmable interrupt controllers being enabled in a non-PC/AT-compatible mode.

24. The microcontroller of claim 23, wherein the plurality of programmable interrupt controllers include a plurality of slave interrupt controllers for selecting among the interrupt request lines according to a predefined interrupt signal priority and a master interrupt controller for selecting among the selected interrupt request lines received from the plurality of slave interrupt controllers.

25. The microcontroller of claim 24, further comprising:
an interrupt control register to selectively enable and disable programmable interrupt controllers of the plurality of programmable interrupt controllers in a PC/AT-compatible mode.

26. The microcontroller of claim 23, the programmable router further comprising:
a plurality of channel routers to route one of the plurality of interrupt signals to an interrupt request line associated with a channel router of the plurality of channel routers, thereby forming an interrupt switch matrix, comprising:
a selection circuit to selectably enable individual interrupt signals; and
a logic circuit to direct enabled interrupt signals to the interrupt request line associated with the channel router.

27. The microcontroller of claim 26, wherein the interrupt signals are enables according to predetermined values of interrupt trigger bits associated with each interrupt signal.

28. The microcontroller of claim 23, wherein the values of the interrupt trigger bits are set under software control.

29. The microcontroller of claim 26, further comprising:
a router between the plurality of slave interrupt controllers and the master interrupt controller, the second interrupt switch matrix directing any of the interrupt request lines from any of the plurality of slave interrupt controllers to any output of the master interrupt controller.

30. The microcontroller of claim 26, the plurality of channel routers further comprising:
a polarity inversion circuit coupled to a selected plurality of channel router inputs of the plurality of channel routers for inverting interrupt signals.

31. The microcontroller of claim 23, further comprising:
a non-maskable interrupt channel router to route one of a plurality of non-maskable interrupt signals to a processor.

32. The microcontroller of claim 23, wherein only a master programmable interrupt controller and a slave programmable interrupt controller of the plurality of programmable interrupt controllers are enabled in a PC/AT-compatible mode.

33. The microcontroller of claim 23, wherein the plurality of programmable interrupt controllers comprise 8259-compatible programmable interrupt controllers.

34. The microcontroller of claim 23, the plurality of programmable interrupt controllers comprising:
a master programmable interrupt controller and first slave programmable interrupt controller enabled in the PC/AT-compatible mode and a non-PC/AT-compatible mode; and
a second slave programmable interrupt controller disabled in the PC/AT-compatible mode and enabled in the non-PC/AT-compatible mode.

35. The microcontroller of claim 23, wherein the programmable router provides for sharing of the interrupt and non-maskable interrupt sources on a single interrupt priority channel.

36. The microcontroller of claim 35, wherein the number of interrupt sources is more than the available number of interrupt priority channels.

37. The microcontroller of claim 36, whereby interrupt sharing is provided for both internally generated interrupts and externally generated interrupts.

38. The controller of claim 23, wherein the plurality of interrupt sources are recognized as edge triggered in a edge triggered interrupt mode or as level triggered in a level triggered interrupt mode.

39. The controller of claim 38, wherein the interrupt mode is selectable such that all of the interrupts are recognized as either edge triggered or level triggered in a global mode or individually recognized as either edge triggered or level triggered on a per interrupt source basis.

* * * * *